United States Patent

[11] 3,555,190

[72] Inventor Warren L. Braun
Harrisonburg, Va.
[21] Appl. No. 700,550
[22] Filed Jan. 25, 1968
[45] Patented Jan. 12, 1971
[73] Assignee Television, Radio and Film Communication
Nashville, Tenn.

---

[54] AUTOMATIC TELEPHONE CONFERENCE CONNECTOR
6 Claims, 5 Drawing Figs.

[52] U.S. Cl. ........................................................ 179/1
[51] Int. Cl. ........................................................ H04m 3/56
[50] Field of Search .......................................... 179/1CONF, 18.01, 1FBS, 1VC, 170.2

[56] References Cited

UNITED STATES PATENTS

| | | | |
|---|---|---|---|
| 2,164,752 | 7/1939 | Nyquist ........................ | 179/170 |
| 2,189,306 | 2/1940 | Anderson ...................... | 179/1 |

*Primary Examiner*—Kathleen H. Claffy
*Assistant Examiner*—Douglas W. Olms
*Attorney*—Sughrue, Rothwell, Mion, Zinn & MacPeak

---

ABSTRACT: An automatic interconnector of two normal telephone calls from standard subscriber drops, simultaneously permitting a local party to talk with both external parties, with three-way conversation mode normal to conference telephony. Switching systems are provided for assigning priorities to each of the parties.

INVENTOR
WARREN L. BRAUN
BY Sughrue, Rothwell, Mion, Zinn & Macpeak
ATTORNEYS

AUTOMATIC TELEPHONE CONFERENCE CONNECTOR

BACKGROUND OF THE INVENTION

This invention relates to a conference call connection system, and particularly to a conference call connection system for use in radio broadcasting or recording of conferences wherein one or more of the parties to the conference are taking part in the conference by telephone.

The prior art includes a number of conference connection systems. The telephone company in most area provides this service. However, the ordinary conference connection system provides for the continuous interconnection of all the telephones involved in the conference. Thus even when only one party to the conference is speaking, the noise signals from all of the telephone connections are fed to the parties of the conference. It is very difficult with prior art conference connections systems to obtain an audio signal of broadcast quality.

SUMMARY OF THE INVENTION

The automatic telephone conference connector is a device designed to optimize and mix two conventional telephone calls together with a local microphone channel in a hands-free conference telephone arrangement and to provide this combination for broadcast use. The unit contains provisions enabling the user to connect conference calls on location. The connector allows the host circuit to automatically override both telephone circuits in the broadcast output. It contains band-pass shaping in the telephone broadcast circuit to optimize intelligibility. Automatic level compensation is provided in each broadcast connected circuit. The program audio information is fed to standby callers via acoustic couplers.

It is an object of this invention to provide equipment interconnection such that normal telephonic conference function can take place simultaneously and consistent with broadcasting requirements and to allow the use of such equipment with standard subscriber telephone lines and equipment.

It is a further object of this invention to provide a system for automatically discriminating between local conversation and external conversation when radiated from a loud speaker in the vicinity of the microphone such that telephonic operation is possible without the risk of feedback or degeneration of the telephone circuits.

It is another object of this invention to provide for separate automatic gain control on each circuit in such a fashion as to avoid excessive gain reduction action while equalizing the loudness range of each talking party.

It is a further object of this invention to provide for automatic reduction of the volume of each external party's conversation immediately when the local party commences speaking, providing a local party override function so essential to good telephonic broadcast technique.

It is a further object of this invention to provide a system of acoustical interconnection with the telephone hand set when an external party is waiting to be interconnected with the conference, and by this technique to allow listening participation in the conference call until such time as the additional party is brought into the conference.

BRIEF DESCRIPTION OF THE DRAWINGS

FIG. 1, including

DESCRIPTION OF PREFERRED EMBODIMENTS

Figure 1A:
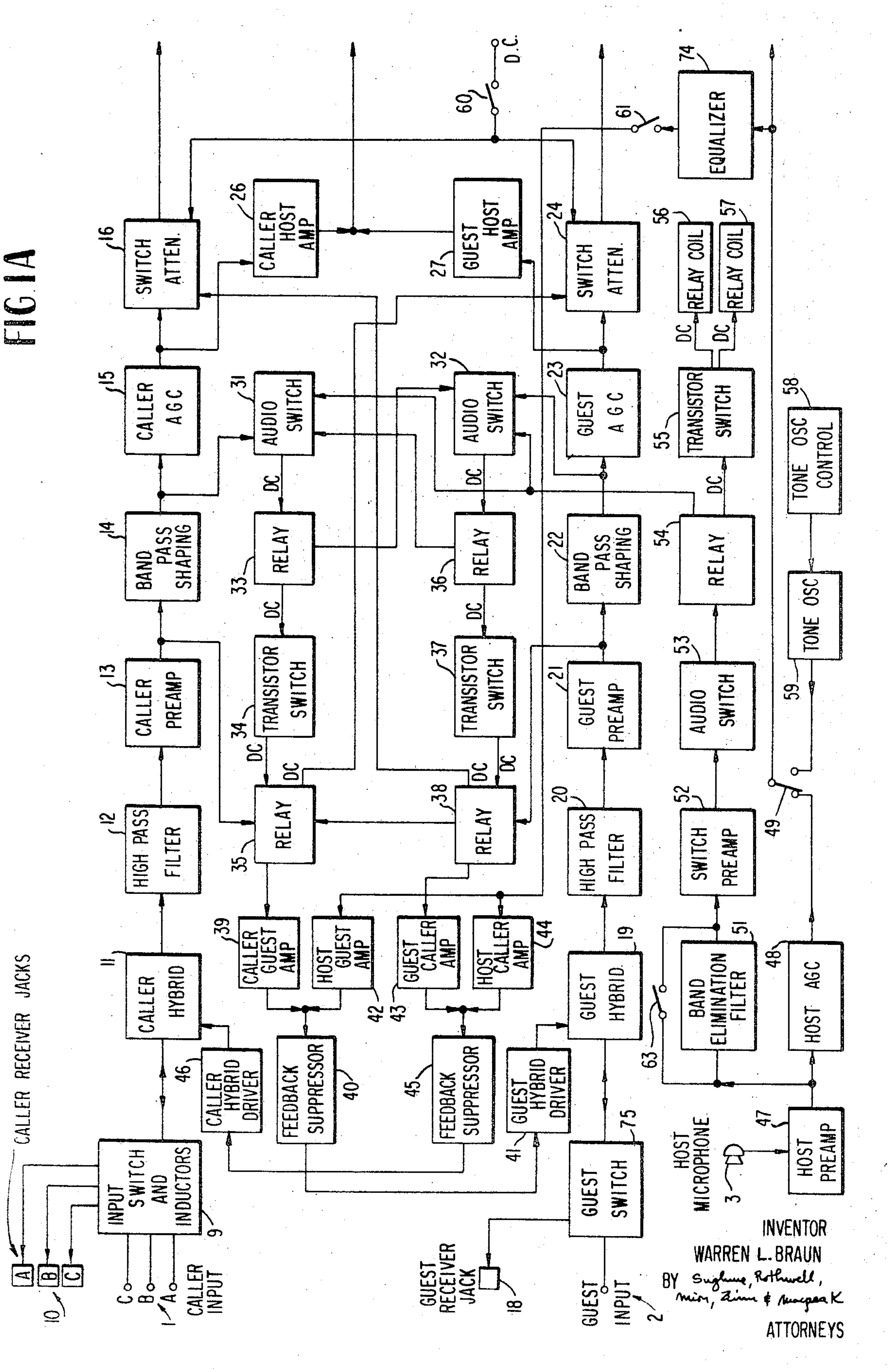
FIGS. 1A and 1B, is an overall block diagram of the automatic telephone conference connector system.
Figure 1B:
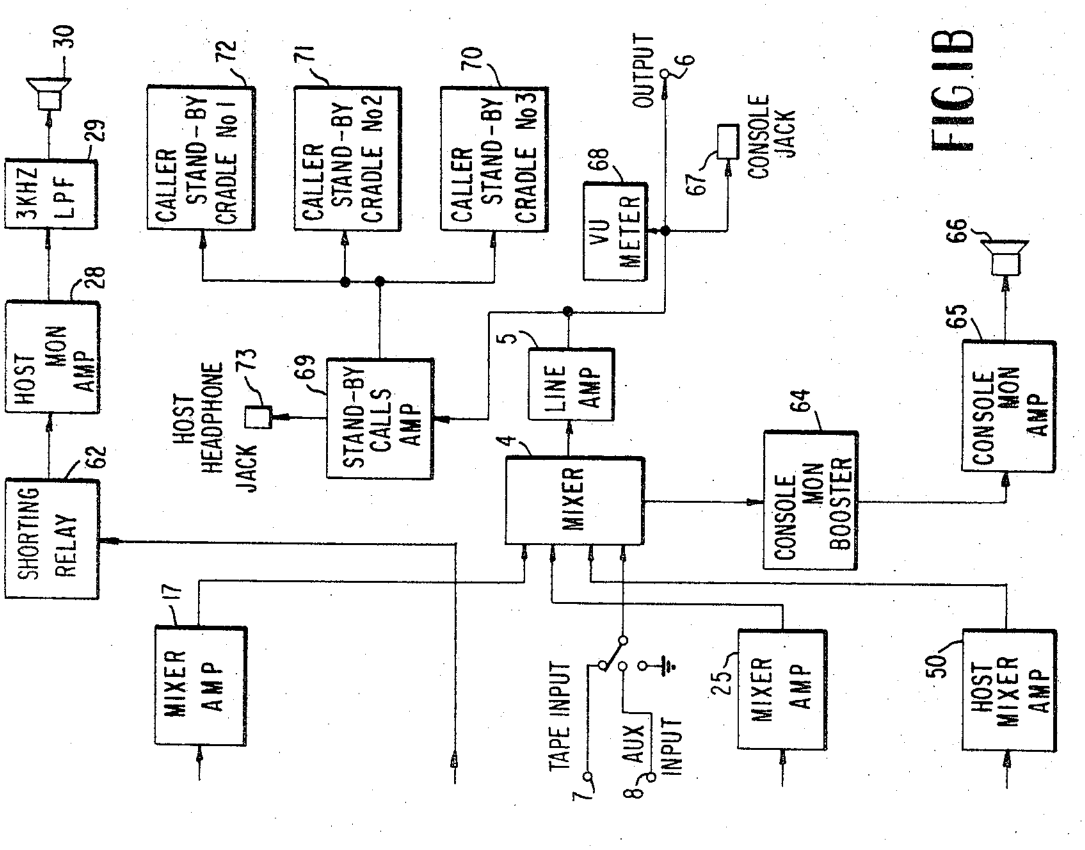

FIG. 1 is a block diagram of the automatic telephone conference connector (ATCC), which provides for the automatic interconnection of two normal telephone calls from standard telephone lines and of a locally originated conversation. This interconnection allows a three-way conversation including three persons, indentified as "host," "guest" and "caller." The host is normally in a studio near the ATCC equipment. The guest and the caller are normally at separate remote locations and are connected to the studio equipment by telephone.

In FIG. 1, the circuit has three major sections which are interconnected and connected to some common circuitry. These sections are the "caller circuit," "guest circuit," and the "host circuit."

The caller's voice enters the ATCC system through caller input 1 from a standard telephone line (not illustrated). The guest's voice enters the system through guest input 2 which may almost be from another standard telephone line (not illustrated). The host's voice enters the system through host microphone 3. After various operations have been done on the voice signals from these three sources, the voice signals are mixed in mixer 4, amplified by line amplifier 5 and fed to an output terminal 6. The output signal contains the caller, guest, and host input voice signals, controlled and mixed according to the invention. Output terminal 6 may be connected for live broadcast or recording for future use. Provision is also made for high impedance inputs to be switched directly to mixer 4 from tape input 7 or auxiliary input 8.

Referring to the caller circuit, signals from caller input 1 are connected to input switch and inductor unit 9. Unit 9 contains switches to select one of three caller telephone line inputs, A, B or C, for connection into the conference. Unit 9 also connects the conversation signals of the guest and host back to caller receiver jacks 10, in a manner to be explained. From unit 9 the caller input signal is connected to caller hybrid 11, an isolation transformer circuit well known in the telephone art. The caller hybrid has two outputs, forward and return. The caller input signal goes through hybrid 11 as the forward output signal to high pass filter 12, in which cutoff is fixed at about 200 Hz. to eliminate hum and undesired low frequency signals. The output of filter 12 goes to caller preamp 13, which in the preferred embodiment is set to =28 dbm. gain. The preamp output is shaped for maximum speech intelligibility in band-pass shaping unit 14. The output of unit 14 is fed to caller automatic gain control (AGC) amplifier 15 which provides automatic gain and level control. The AGC output goes to switchable attenuator 16, which is transistorized DC switching circuit having ON and OFF conditions. In the preferred embodiment the switch, when OFF, provides 20 db. attenuation and, when ON, provides 30 db. attenuation. However, a conventional gate could also be used for unit 16. The attenuator output proceeds to caller mixer amplifier 17, which acts as a buffer amplifier and feeds caller signals to mixer 4.

Referring to the guest circuit, signals from guest input 2 are fed through guest switch 75 directly to guest hybrid 19, which also has forward and return outputs. The return output signal from hybrid 19 is connected back to guest receiver jack 18 to return the conversation signals of caller and host to the guest in a manner to be explained. No switching circuit comparable to unit 9 is needed in the guest circuit, as there is only one guest at one time with the preferred embodiment. However, if more than one guest were desired, a similar unit could be included. Units 19 through 25 are symmetric with those in the caller circuit and need no further description.

Provision is made for the hose to hear the conversation of guest and caller in the studio without the use of earphones or telephone. The output of caller AGC 15 is sent to caller host amplifier 26 and the output of guest AGC 23 is sent to guest host amplifier 27. The outputs of amplifiers 26 and 27 are mixed and sent to host monitor amplifier 28, then through 3 Kilohertz low-pass filter 29 to studio loudspeaker 30. Filter 29, when used in band elimination filter 51, as will be explained in more detail, eliminates reverberation or feedback from the studio speaker. 3 KHz. is chosen because that is the highest intelligible signal which is transmitted by an ordinary telephone line.

Audio switches 31 and 32 are used to prevent either the guest or the caller from interrupting the other's conversation. The caller and guest circuits are symmetric. An explanation follows for the caller circuit, but the similar operation of the guest circuit is obvious from this explanation. Audio switch 31 includes a 1000 Hz. peaking circuit for receiving output of shaping unit 14. The voice signal from the peaking circuit activates a switch in unit 31 which in turn activates relay 33. The output of relay 33 activates transistor switch 34 which in turn activates relay 35. Likewise, relay 38 is activated as a result of the output signal from shaping unit 22. Relays 35 and 38 are each self-holding if and only if the other relay is in a relaxed position.

When relay 35 is activated, the output signal from caller preamp 13 is routed via relay 35 to caller guest amplifier 39. When caller audio switch 31 is activated, relay 33 disables guest audio switch 32 to prevent switch 32 from operating after caller has seized the line. Switch 31 also causes relay 35 to release caller switchable attenuator 16 unless, as explained later, the host is talking. Thus, once the caller (or guest) has seized the line, he cannot be interrupted by the guest (or caller) as long as he continues talking.

Each switch, 31 and 32, has a built-in time constant such that if it receives no audio input for a predetermined time, the switch relaxes and permits activation of the other of the two switches. In the preferred embodiment, this predetermined time is 20 milliseconds. This allows either the guest or the caller to seize the line when the other's conversation stops for 20 milliseconds. Of course other predetermined times could be used as a matter of design or adjustment choice, and would be within the scope of this invention.

Referring to the host circuit, the host speaks into microphone 3. The signal from microphone 3 passes through host preamplifier 47 host AGC 48, manual switch 49 and host mixer amplifier 50 and enters mixer 4. The signal from host preamplifier 47 also enters band elimination filter 51 and passes on to switch preamplifier 52 audio switch 53, and relay 54. The purpose of relay 54 is to allow the host to seize the line to the exclusion of both the guest and the caller. Anytime the host speaks into the microphone, he activates relay 54.

Band elimination filter 51 is designed to pass only signals below 200 Hz. or above 3000 Hz. This allows vocal signals from the host's voice, which have components above and below the eliminated frequencies to pass through filter 51 to activate relay 54. However, sounds from studio speaker 30 have not components above 3000 Hz., because these high components are eliminated by filter 29. The output of speaker 30 also has no components below 200 Hz. because these low components are eliminated by filters 12 and 20. Thus, the sound from speaker 30 can be picked up by microphone 3 without operating relay 54. As will become apparent from the explanation of the purpose of relay 54, there are no sounds from speaker 30 when the host has seized the circuit. Therefore there is no feedback from the studio speaker to interfere with the host circuit.

Relay 54 sends switching signals to audio switches 31 and 32 to operate switch attenuators 16 and 24. These attenuators cause the guest and caller signals to be greatly attenuated whenever the host is speaking, allowing the host to seize the line.

Relay 54, when actuated, also sends a signal to transistor switch 55 which operates relay coils 56 and 57. Although mechanical relays are shown used in connection with these coils, electronic or solid state relay equivalents could be used throughout the ATTC unit instead of illustrated mechanical relays, and these equivalents would be within the scope of the invention. Coils as such would not be needed with such equivalents.

Relay coil 56, operating when the host is speaking, causes shorting relay 62 to short to ground the input of host monitor amplifier 28, disabling studio speaker 20 while the host is speaking. Relay coil 56 also closes switch 61 when the host is talking, allowing the host audio signal from host AGC 48 to pass through equalizer 74, switch 61 and enter host caller amplifier 44 and host guest amplifier 42.

Relay coil 57, also operating when the host is speaking, operates switch 63, thus bypassing band elimination filter 63 to allow utilization of the full range of host voice frequency energy for more positive holding of host audio switch 53. Coil 57 also closes switch 60 when the host is speaking. Switch 60 applies to a positive DC signal to switch attenuators 16 and 24, reducing the gain of these circuits by 10 db.

The caller voice signal from caller guest amplifier 39 is summed with the host voice signal from host guest amplifier 42. In practice these two voice signals can never occur simultaneously, so the summing is effectively the same as putting on line whichever signals exists. The summed output of amplifiers 39 and 42 is fed to guest hybrid driver 41, with an optional connection through a feedback suppressor 40.

A feedback suppressor is not essential to the correct operation of the ATTC system, but in certain circumstances a feedback suppressor may improve the operating characteristics of the system. The feedback suppressor may be of the type marketed by Audio Instrument Company, Inc., as Model 400A. It operates by increasing the frequency of signals passing through the system by a small amount, perhaps by 5 Hz. thus avoiding feedback at a resonant frequency.

The audio signal from guest hybrid driver 41 enters guest hybrid circuit 19 and is fed back through guest switch 75 to guest receiver jack 18, thus allowing the guest to hear what is said by the caller and the host.

It is obvious from this explanation that input signals to amplifiers 43 and 44 will appear at caller receiver jacks 10 to allow the caller to hear the guest and the host.

When there is no host audio, manual switch 49 may be connected to the output of 1000 Hz. tone oscillator 59. This could be done automatically by connecting switch 49 to be controlled by coil 56 or 57. Tone oscillator control 58 controls tone oscillator 59 to cause the emission of beeping signals required by some telephone regulations for broadcast or recording of telephone conversation. This beeping signal is fed back to the guest and caller via amplifiers 42 and 44.

The output of mixer 4 is fed through console monitor booster amplifier 64 to console monitor power amplifier 65 hence to console monitor loudspeaker 66. This allows the studio engineer to follow and monitor the program going out.

Line amplifier 5 receives and amplifies the output of mixer 4. The output of amplifier 5 can be fed to a standard VU meter 68 for measurement and to a console jack 67 for use with earphones. The output of amplifier 5 is also fed to an additional amplifier 69 for transmission cradles 70, 71 and 72 to the receivers to telephones connected through telephone lines to telephones of other callers awaiting a chance to speak to the guest and host. A jack 73 for host earphones is also provided.

Figure 2:
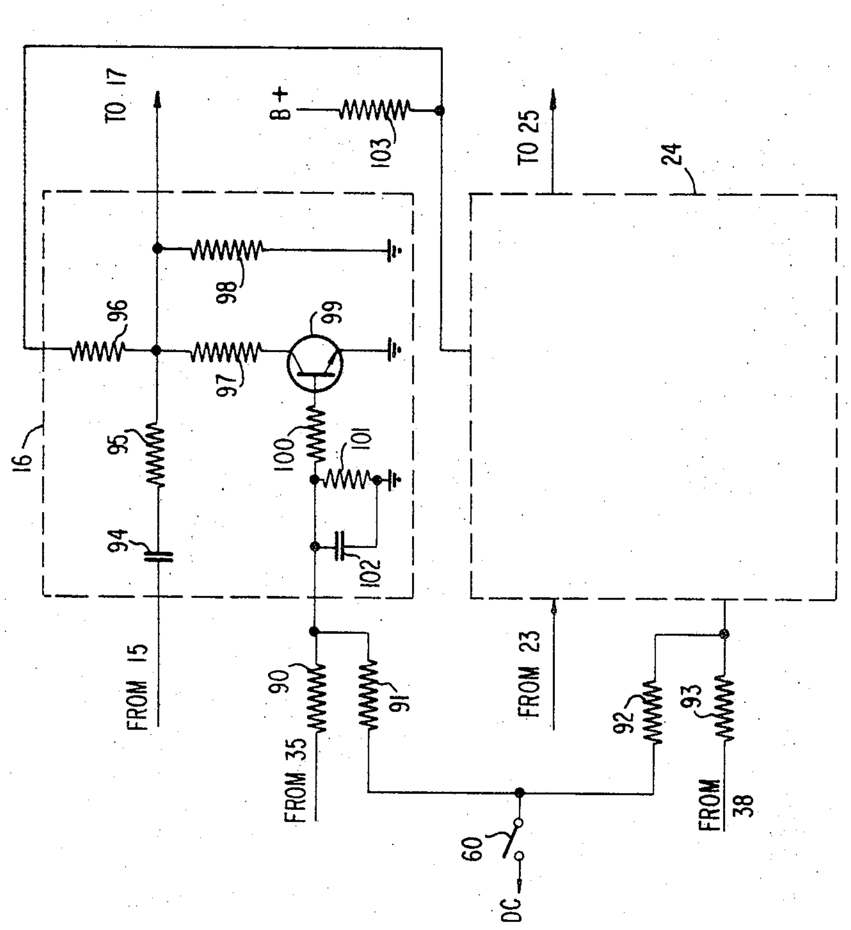
FIG. 2 illustrates in more detail the structure of switch attenuator 16 from FIG. 1.

FIG. 2 shows in more detail the structure of switch attenuator 16 (attenuator 24, shown in block form, is identical). The caller voice channel comes from element 15 into block 16 entering coupling capacitor 94 and series resistor 95. After some attenuation ( 20 db. in the preferred embodiment) by the voltage divider 95, 98, the signal continues out to element 17. This assumes that transistor 99 is cut off with ground potential on its base, thus eliminating resistor 97 from the voltage divider.

When a positive DC signal comes in through either of resistors 90 or 91, transistor 99 is made conductive, introducing resistor 97 into the voltage divider and causing further attenuation of the audio signal. The total attenuation is 30 db. in the preferred embodiment.

Transistor 99 can be biased to conductivity either by a signal from relay 35 through resistor 90, indicating that the guest has seized the line, or by a signal through closed switch 60 and resistor 91, indicating that the hose has seized the line. The attack time or time required to seize the circuit is controlled by the RC time constant of resistor 90 or 91 with capacitor 102 and is 50 milliseconds in the preferred embodiment. The release time is controlled by the RC time constant of resistor 101 with capacitor 102 and is also 50 milliseconds in the preferred embodiment. A DC bias signal is provided through resistors 103, 95 and 97 forward bias transistor 99. This is eliminated at the input and output by capacitor coupling.

Figure 3:
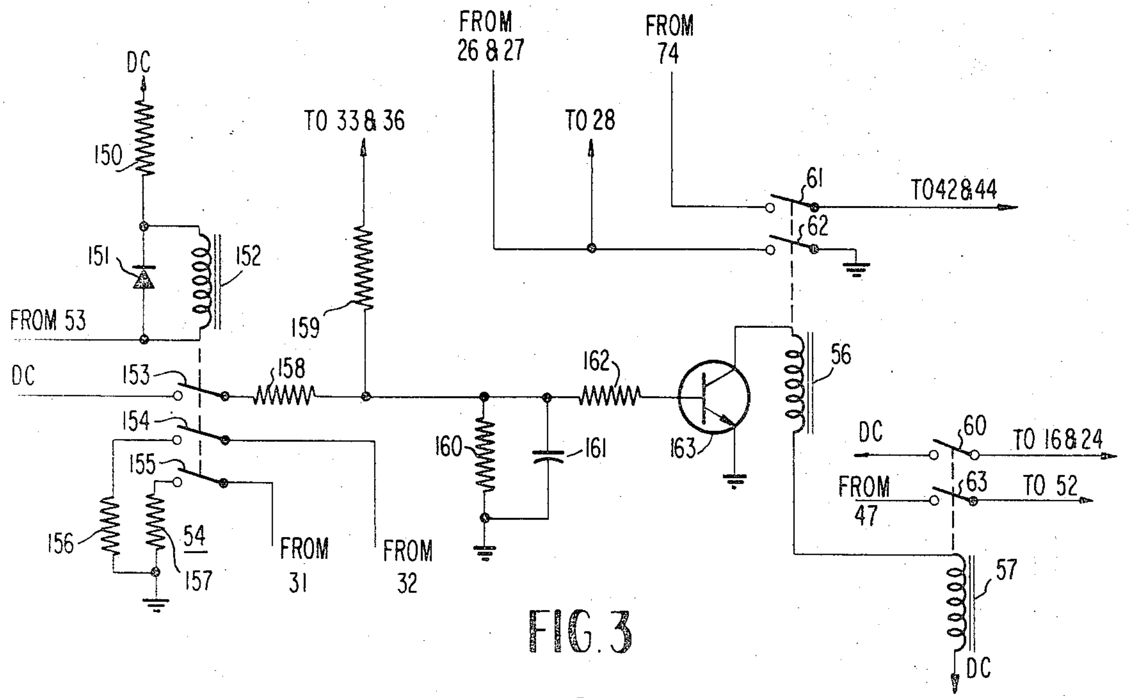
FIG. 3 illustrates in more detail the structure and connections of elements 54 through 57 and the associated switches as illustrated in FIG. 1.

FIG. 3 shows in more detail the structure and connections of elements 54 through 57 and the associated switches. A DC input signal activates coil 152 of relay 54 in response to a signal from switch 53. When coil 152 is activated the contacts of switches 153, 154 and 155 make connection. Switches 154 and 155 respectively short the outputs of audio switches 32 and 31 to ground, preventing either guest or caller from seizing the line while the host is talking. Switch 153 connects DC through resistors 158 and 162 to cause transistor switch 163 to conduct. RC circuit 160, 161 holds the transistor switch 163 in its conducting state for a time after relay 54 is deactivated. However, if either guest or caller attempts to speak after relay 54 is reopened, the guest or caller audio switches 32 and 31 will no longer be inhibited and relay 36 or 33, when closed will cause capacitor 161 to be quickly discharged through resistor 159.

When switch 163 conducts, coils 56 and 57 are activated, closing switches 60 through 63. The functions of these switches have been explained.

Figure 4:
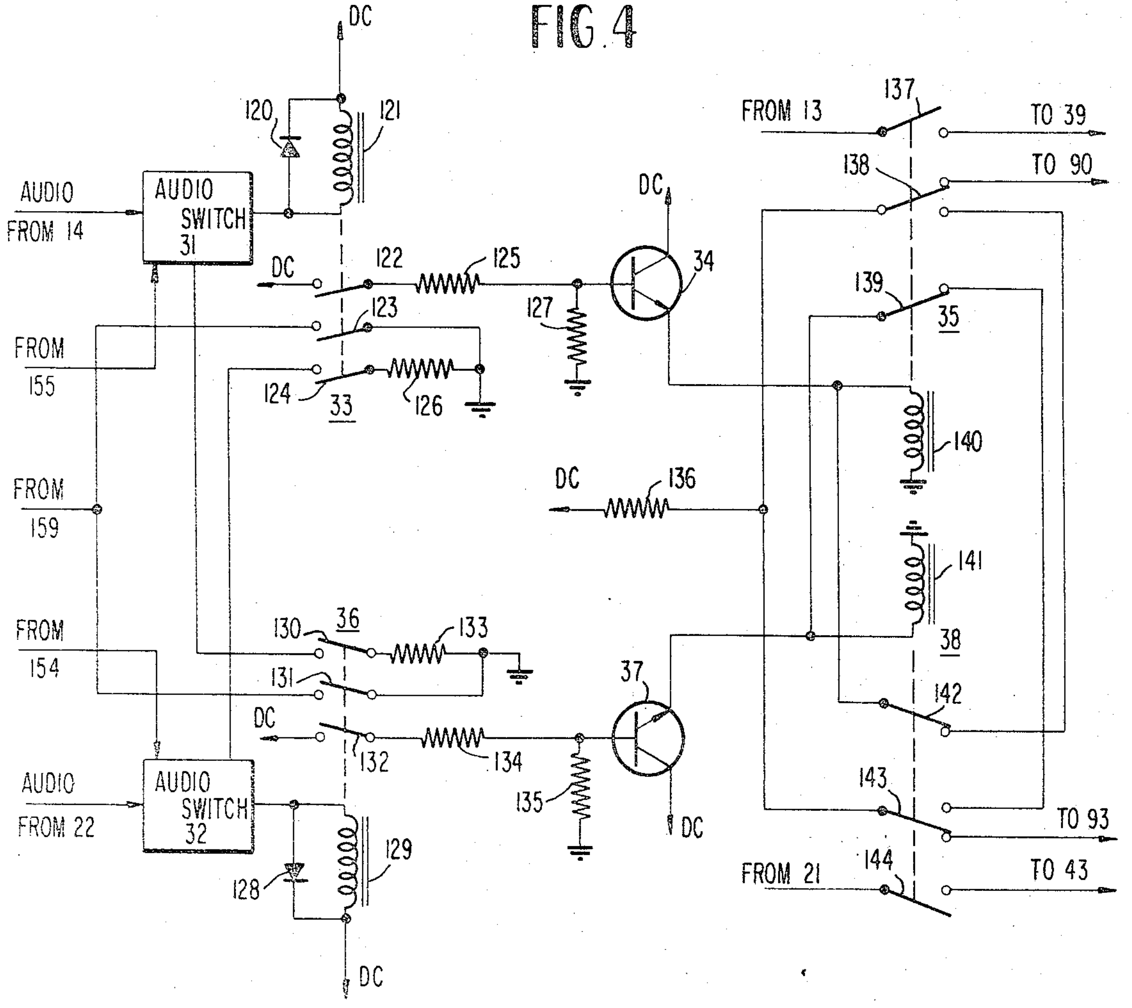
FIG. 4 illustrates in more detail the connections of elements 31 through 38 as shown in FIG. 1.

FIG. 4 shows in more detail the connections of elements 31 through 38. Each audio switch is a combination of amplifier rectifier and DC amplifier. Upon receipt of an audio signal from unit 14, audio switch 31, if uninhibited causes a DC energization of relay coil 121, thus closing switches 122, 123 and 124. Switch 124 connects an input of audio switch 32 to ground through resistor 126, inhibiting energization of switch 32. Switch 123 grounds resistor 159, discharging capacitor 161.

Switch 122 applies a bias to transistor switch 34 causing it to conduct and apply an energizing current to coil 140. Coil 140 closes switches 137, 138 and 139. Switch 137 routes a signal from caller preamp 13 to caller guest amplifier 39. Switch 138 when not energized applies a DC signal from resistor 136 to resistor 90 to cause switch attenuator 16 to further attenuate the caller audio signal. But when the caller is speaking, switch 138 is energized to apply a DC signal through deenergized guest switch 142 back to coil 140 for latching of relay 35. Thus, when the caller switches are energized and the caller has momentarily ceased speaking, the caller still has the line unless the guest speaks. Guest audio switch 32 is only inhibited through switch 124 when the caller is actually talking. Switches 139 and 142 prevent the relays from changing states until the other party to the conversation begins speaking. Obviously the functions of the guest circuitry are symmetrical with those of the caller circuitry.

Switch attenuators 16 and 24 could be replaced by variable gain amplifiers, with due consideration for changed connections needed from relays 35 and 38.

Many more examples of the present invention will suggest themselves to those skilled in the art. Alternative methods of accomplishing the invention may suggest themselves to those skilled in the art. Accordingly, the scope of the present application is only limited to the extent of the claims which follow.

I claim:

1. An apparatus for receiving audio signals from a plurality of signal channels, for determining a priority for signals from each of said signal channels, and for supplying only one of said audio signals to a utilization means at any one time according to said priority, comprising:

a. first and second signal channels respectively carrying first and second audio frequency signals;
b. first adjusting signal switch means responsive to the presence of said first audio frequency signal and to the absence of said second audio frequency signal for more than a predetermined time for generating a first adjusting signal;
c. second adjusting signal switch means responsive to the presence of said second audio frequency signal and to the absence of said first audio frequency signal for more than a predetermined time for generating a second adjusting signal; and
d. first and second signal magnitude adjustment means respectively receiving said first and second audio frequency signals and responsive respectively to said second and first adjusting signals for varying the amplitude of said first and second audio frequency signals supplied to said utilization means.

2 An apparatus according to claim 1 further comprising an inhibiting switch means responsive to the continuing presence of said one of said first and second audio frequency signals to inhibit said adjusting signal switch means form causing said other of said first and second audio frequency signals to be supplied to said utilization means.

3. Apparatus according to claim 2 wherein each of said adjusting signals has one of two possible magnitudes.

4. An apparatus according to claim 2 further comprising:

e. a third signal channel carrying a third audio frequency signal to said utilization means;
f. override switch means responsive to the presence of a third audio frequency signal to generate an override adjustment signal; and
g. means to supply said override adjustment signal to said first and second signal magnitude adjustment means to cause said first and second audio frequency signals to be supplied to said utilization means.

5. An apparatus according to claim 1 further comprising: means, responsive to the presence of said first audio signal and to the absence of said second audio signal for more than a predetermined length of time for supplying said first audio frequency signal to said second signal channel and means, responsive to the presence of said second audio signal and to the absence of said first audio signal for more than a predetermined length of time, for supplying said second audio signal to said first signal channel.

6. An apparatus for receiving audio signals from a plurality to signal channels, for determining a priority for signals from each of said signal channels, and for supplying only one of said audio signals to utilization means at any one time according to said priority comprising:

a. a first signal channel carrying a first audio frequency signal;
b. a signal magnitude adjustment means for supplying said first audio frequency signal to said utilization means.
c. a second signal channel for supplying a second audio frequency signal to said utilization means;
d. switch means responsive to the presence of said second audio frequency signal for generating a control signal;
e. means for supplying said second audio frequency signal to said switch means only when said second audio frequency signal contains frequencies below a predetermined lower frequency or above a predetermined higher frequency; and
f. means responsive to said control signal for causing said signal magnitude adjustment means to not supply said first audio frequency signal to said utilization means.